US009734967B2

(12) United States Patent
Fukui et al.

(10) Patent No.: US 9,734,967 B2
(45) Date of Patent: Aug. 15, 2017

(54) OPERATING PANEL DEVICE

(71) Applicant: Panasonic Intellectual Property Management Co., Ltd., Osaka (JP)

(72) Inventors: Satoru Fukui, Osaka (JP); Tsuyoshi Tanaka, Kyoto (JP); Seiichi Nishimura, Osaka (JP); Sho Sonoda, Aichi (JP); Hitokazu Shitanaka, Fukui (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/905,784

(22) PCT Filed: Oct. 14, 2014

(86) PCT No.: PCT/JP2014/005193
§ 371 (c)(1),
(2) Date: Jan. 16, 2016

(87) PCT Pub. No.: WO2015/056437
PCT Pub. Date: Apr. 23, 2015

(65) Prior Publication Data
US 2016/0155585 A1   Jun. 2, 2016

(30) Foreign Application Priority Data

Oct. 15, 2013   (JP) .................. 2013-214493
Dec. 4, 2013    (JP) .................. 2013-250820
Sep. 30, 2014   (JP) .................. 2014-200313

(51) Int. Cl.
*H01H 9/26*   (2006.01)
*H01H 13/72*  (2006.01)
(Continued)

(52) U.S. Cl.
CPC .......... *H01H 19/025* (2013.01); *B60K 37/06* (2013.01); *G05G 1/105* (2013.01); *G06F 3/0362* (2013.01);
(Continued)

(58) Field of Classification Search
CPC ................. H01H 19/025; H01H 19/04; H01H 2219/036; H01H 2231/00;
(Continued)

(56) References Cited

U.S. PATENT DOCUMENTS 7,804,036 B2 * 9/2010 Ishigaki ................ B60K 37/06
                                                  200/336
7,926,964 B2 * 4/2011 Claprood .............. G01D 11/28
                                                  362/23.01
(Continued)

FOREIGN PATENT DOCUMENTS

EP        1501007        1/2005
JP        63-052225 U    4/1988
(Continued)

OTHER PUBLICATIONS

International Search Report of PCT application No. PCT/JP2014/005193 dated Jan. 13, 2015.
(Continued)

*Primary Examiner* — Anthony R. Jimenez
(74) *Attorney, Agent, or Firm* — McDermott Will & Emery LLP

(57) ABSTRACT

An operating panel device includes an operating ring, and a display device which is disposed to face a back surface of the operating ring. The display device includes a first portion, a second portion, and a third portion. The first portion is located inside the operating ring, and the second portion is located outside the operating ring. The third portion connects the first portion and the second portion. A
(Continued)

display of the first portion changes in conjunction with a rotational operation applied to the operating ring.

8 Claims, 7 Drawing Sheets

(51) Int. Cl.
| | |
|---|---|
| H01H 13/76 | (2006.01) |
| H01H 19/02 | (2006.01) |
| G05G 1/10 | (2006.01) |
| H01H 19/14 | (2006.01) |
| B60K 37/06 | (2006.01) |
| G06F 3/0362 | (2013.01) |
| H01H 19/20 | (2006.01) |

(52) U.S. Cl.
CPC .............. *H01H 19/14* (2013.01); *H01H 19/20* (2013.01); *H01H 2219/036* (2013.01)

(58) Field of Classification Search
CPC ....... H01H 2231/012; H01H 2231/016; H01H 2233/00; H01H 2233/002; H01H 2233/004; H01H 2233/006; H01H 2233/008; H01H 2233/01; H01H 2233/012; H01H 2233/014; H01H 2233/03; H01H 9/00; H01H 2009/02; H01H 2009/0285; H01H 2009/20; H01H 2221/00; H01H 2223/00; H01H 2223/01; H01H 2223/012024; H01H 2223/026; H01H 2223/028; H01H 2223/03; H01H 2223/034; H01H 2223/0345; H01H 2223/042; H01H 2223/044; H01H 2223/054; H01H 2223/056; H01H 19/14; H01H 19/20; H01H 3/00; H01H 3/02; H01H 3/08; H01H 3/12; H01H 9/02; H01H 9/04; H01H 9/20; H01H 2003/12; H01H 2003/08; B60K 37/06; G05G 1/105; G06F 3/0362
USPC .......... 200/5 A, 5 R, 17 R, 18, 19.06, 19.07, 200/19.18, 19.19, 564, 293, 302.1, 303, 200/329, 341, 345, 292–296, 512–520, 200/308–317, 431, 439, 440, 443, 450, 200/460, 463, 468, 506, 510, 520–522, 200/535, 537, 556, 557, 327; 362/29, 30, 362/85, 28, 23.18, 23.21
See application file for complete search history.

(56) References Cited

U.S. PATENT DOCUMENTS

| 9,076,610 B2* | 7/2015 | Murzyn .............. H01H 25/008 |
| 2006/0163045 A1 | 7/2006 | Kikuya |
| 2013/0249847 A1 | 9/2013 | Goss et al. |
| 2014/0260776 A1* | 9/2014 | Burleson ................. G05G 1/10 74/553 |

FOREIGN PATENT DOCUMENTS

| JP | 9-505163 | 5/1997 |
| JP | 9-198176 | 7/1997 |
| JP | 2006-205753 | 8/2006 |

OTHER PUBLICATIONS

The Extended European Search Report dated Oct. 6, 2016 for the related European Patent Application No. 14854112.1.

* cited by examiner

OPERATING PANEL DEVICE

CROSS-REFERENCE TO RELATED APPLICATIONS

This application is a U.S. national stage application of the PCT International Application No. PCT/JP2014/005193 filed on Oct. 14, 2014, which claims the benefit of foreign priority of Japanese patent applications 2013-214493 filed on Oct. 15, 2013, 2013-250820 filed on Dec. 4, 2013 and 2014-200313 filed on Sep. 30, 2014, the contents all of which are incorporated herein by reference.

TECHNICAL FIELD

The present invention relates to an operating panel device mainly used for setting an air conditioner, an audio set, and the like.

BACKGROUND ART

To control an air conditioner, an audio set, and the like of a vehicle, an operating panel device is used in general. A user can change a display on an operating panel of the device by using buttons provided on the operating panel. Such an operating panel device is required to be easily operated and to have high visibility.

Conventional operating panel device 20 is described with reference to FIG. 9. FIG. 9 is a plan view of operating panel device 20. Operating panel device 20 includes operating ring 11, push panels 12A to 12D, illumination part 13, icons 14A to 14D, and display device 15.

Operating ring 11 can be operated by pushing and can also be operated by rotation. For example, when a user rotatably operates operating ring 11, a set temperature of an air conditioner of a vehicle can be elevated or lowered.

Push switches (not illustrated) are disposed below push panels 12A to 12D, and the push switches can determine which one of push panels 12A to 12D is pushed. Push panels 12A to 12D correspond to icons 14A to 14D provided on illumination part 13. For example, when a user pushes any one of push panels 12A to 12D, a light emitting element (not illustrated) below any one of icons 14A to 14D which corresponds to the pushed push panel emits light. Accordingly, any one of icons 14A to 14D which corresponds to the pushed push panel is illuminated so that the user can easily visually recognize which icon is selected.

In the example shown in FIG. 9, when the user manipulates push panels 12A to 12D, an air conditioner of a vehicle is controlled. For example, when the user pushes push panel 12A, a heater of a window of the vehicle is turned on (icon 14A). When push panel 12B is pushed, inside air/outside air switching in the vehicle is controlled (icon 14B). When push panel 12C is pushed, an automatic control of the air conditioner of the vehicle is turned on (icon 14C). When push panel 12D is pushed, the automatic control of the air conditioner of the vehicle is turned off (icon 14D).

Display device 15 is formed of a liquid crystal display or the like. In a normal state, display device 15 displays current setting of the air conditioner. When the user pushes operating ring 11, the current display is changed to a screen display for changing a set temperature. When the user rotates operating ring 11 in a clockwise direction, the set temperature of the air conditioner is elevated, and when the user rotates operating ring 11 in a counterclockwise direction, the set temperature of the air conditioner is lowered (for example, PTL 1).

CITATION LIST

Patent Literature
PTL 1: Unexamined Japanese Patent Publication No. 2006-205753

SUMMARY OF THE INVENTION

It is an object of the present invention to provide an operating panel device which enables a user (passenger) to easily operate the operating panel device and which have high visibility.

The operating panel device according to the present invention includes an operating ring and a display device. The operating ring includes an operable front surface and a back surface on a side opposite to the front surface. The display device includes a first portion, a second portion, and a third portion, and is disposed to face the back surface of the operating ring. The first portion is located inside the operating ring so as to include an inside center of the operating ring and the second portion is located outside the operating ring. The third portion connects the first portion and the second portion. A display of the first portion changes in conjunction with a rotational operation applied to the operating ring.

With such a configuration, the first portion is largely displayed inside the operating ring, and hence a passenger can easily operate the operating ring, and visibility of the display device can be increased.

DESCRIPTION OF EMBODIMENT

Figure 9:
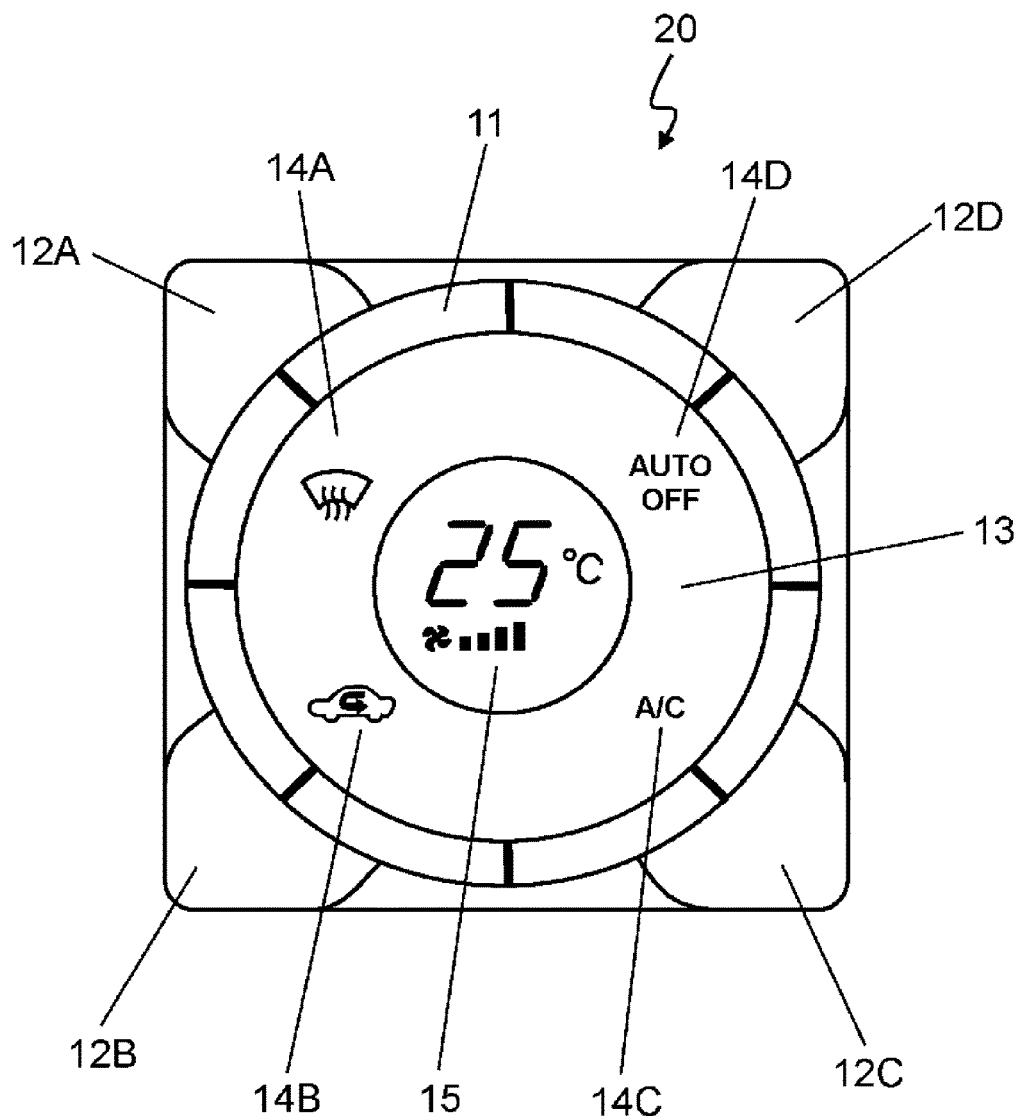
FIG. 9 is a plan view of a conventional operating panel device.

Prior to the description of an exemplary embodiment of the present invention, problems which conventional operating panel device 20 shown in FIG. 9 has are simply described. As described above, illumination part 13 is disposed inside operating ring 11. Push panels 12A to 12D are disposed around operating ring 11. In such an arrangement, display device 15 is disposed between light emitting elements so as to enable light emitted from the plurality of light emitting elements disposed below illumination part 13 to reach icons 14A to 14D. Accordingly, it is necessary to miniaturize display device 15 to avoid the light emitting elements and push switches disposed below push panels 12A to 12D and hence, it may be difficult for a user to see contents displayed on display device 15.

Figure 1:
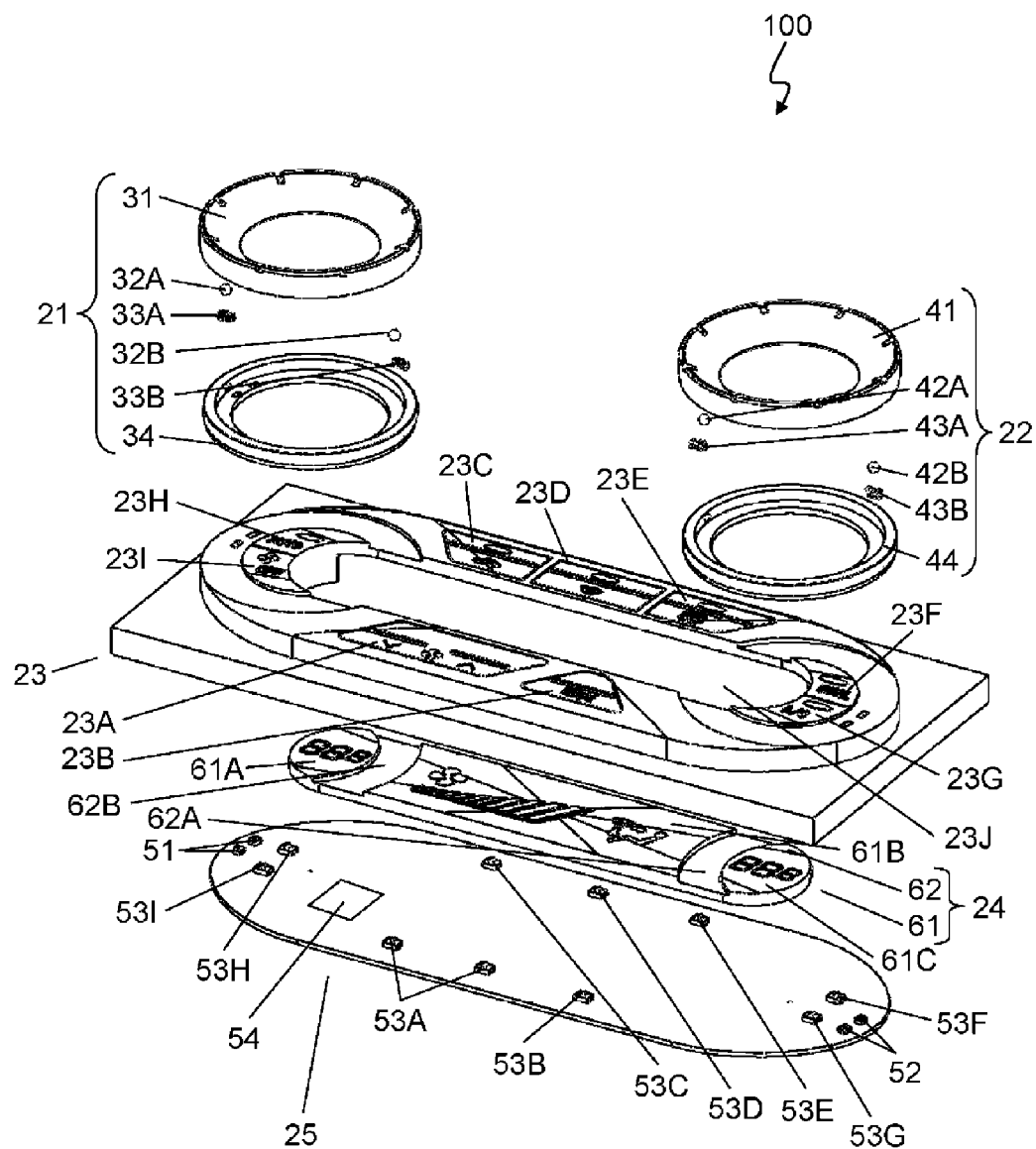
FIG. 1 is an exploded perspective view of an operating panel device according to an exemplary embodiment of the present invention.
Figure 2:
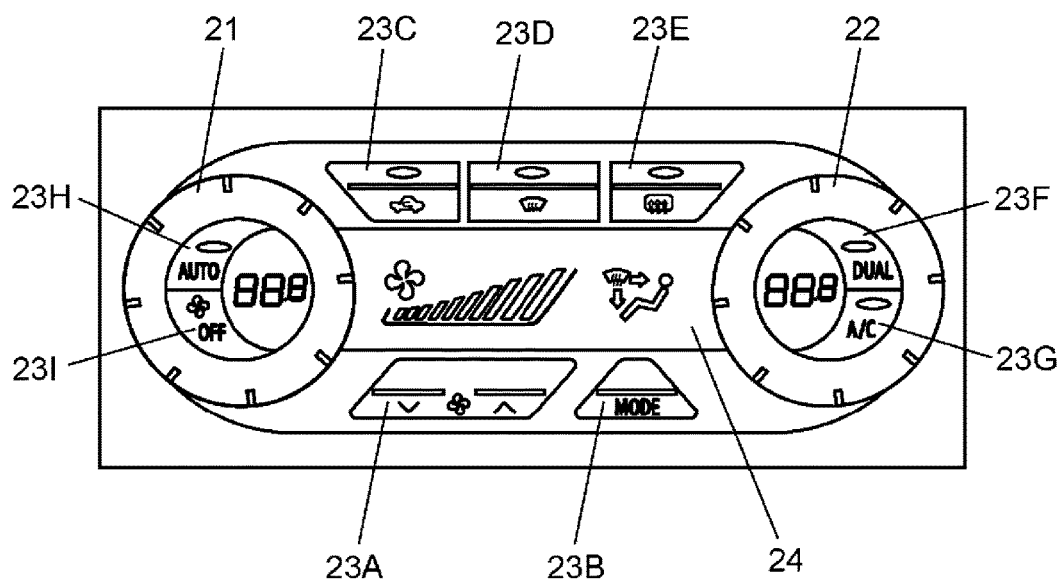
FIG. 2 is a plan view of the operating panel device shown in FIG. 1.

Hereinafter, an operating panel device according to an exemplary embodiment of the present invention which is easily operated by a user (a passenger) and which has high visibility is described with reference to drawings. FIG. 1 and FIG. 2 are an exploded perspective view and a plan view of the operating panel device according to the exemplary embodiment of the present invention, respectively. Operating panel device 100 includes operating rings 21, 22, panel 23, display device 24, and printed circuit board 25.

Operating ring 21 includes rotary part 31, balls 32A, 32B, springs 33A, 33B which are elastic bodies, and fixed part 34. In the same manner as operating ring 21, operating ring 22 includes rotary part 41, balls 42A, 42B, springs 43A, 43B, and fixed part 44. Operating ring 21 and operating ring 22 have substantially the same configuration and hence, hereinafter, the configuration of operating ring 21 is described. An upper surface of rotary part 31 can be operated by a user. A lower surface of fixed part 34 faces display device 24 with panel 23 interposed therebetween. That is, an upper surface of operating ring 21 is a surface which can be operated by a user, and a lower surface of operating ring 21 on a side opposite to the upper surface is a back surface which faces display device 24.

Figure 3:
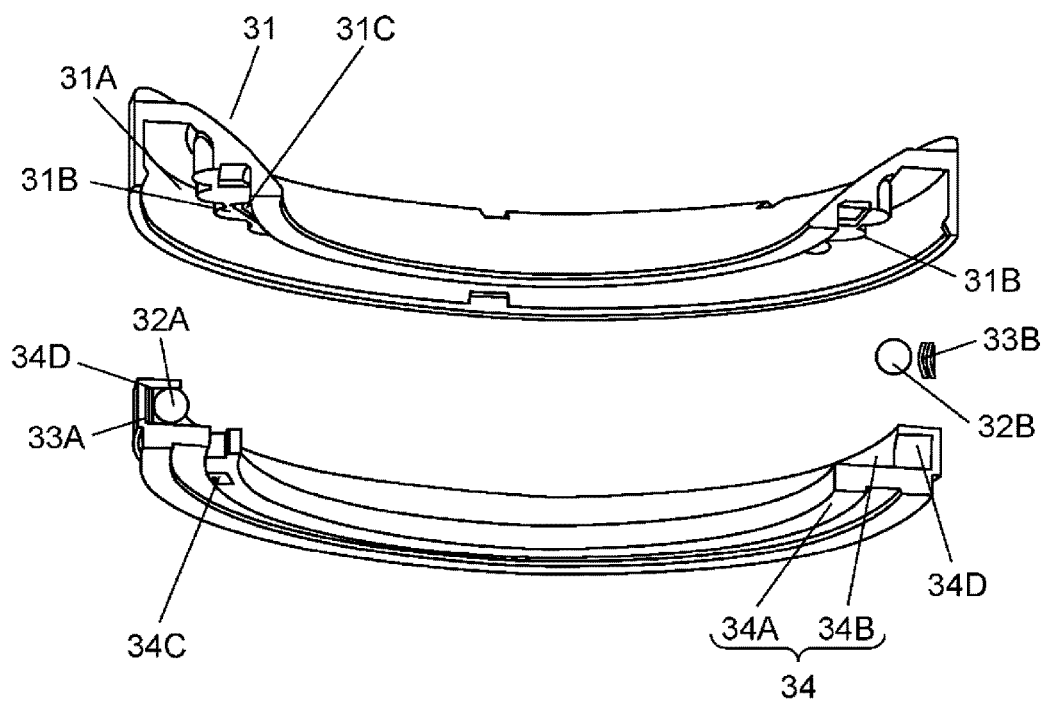
FIG. 3 is an exploded perspective view with a part broken away of an operating ring of the operating panel device shown in FIG. 1.
Figure 4:
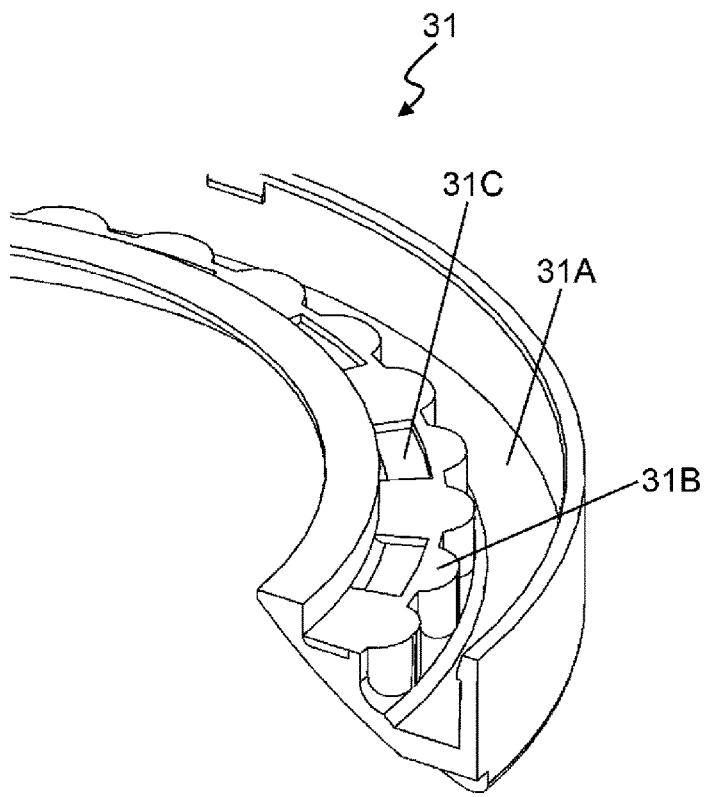
FIG. 4 is a perspective view with a part broken away of a rotary part shown in FIG. 3.

Next, the configuration of operating ring 21 is described with reference to FIG. 3 and FIG. 4. FIG. 3 is an exploded perspective view with a part broken away of operating ring 21. FIG. 4 is a perspective view with a part broken away of rotary part 31 as viewed from below.

Rotary part 31 has a ring shape, and guide groove 31A is formed over a whole circumference of a lower surface of rotary part 31 which faces display device 24. Click ridge portion 31B having projections and depressions repeated over a whole circumference is formed on an inner peripheral wall of guide groove 31A. Recesses 31C are formed on a lower surface of click ridge portion 31B such that each recess 31C is formed for every one cycle of projection and depression of click ridge portion 31B.

Fixed part 34 includes ring-shaped flat plate portion 34A, and guide rail portion 34B. Guide rail portion 34B projects from flat plate portion 34A over the whole circumference of flat plate portion 34A, and is located inside guide groove 31A formed in rotary part 31. Hole 34C is formed in flat plate portion 34A. Hole 34C is formed at a position where hole 34C passes through areas below recesses 31C when rotary part 31 is rotated in a state where fixed part 34 and rotary part 31 are assembled to each other.

Recess 34D which is recessed in the direction from the inner periphery to the outer periphery is formed on guide rail portion 34B. Ball 32A and spring 33A are stored in recess 34D. Ball 32B and spring 33B are stored in recess 34D at a position on a side opposite to ball 32A and spring 33A with respect to the center of flat plate portion 34A.

Fixed part 34 is assembled to rotary part 31 in a state where guide rail portion 34B is inserted into guide groove 31A.

Spring 33A is disposed on an outer peripheral side of ball 32A, and a first end of spring 33A is in contact with fixed part 34. A second end of spring 33A is in contact with ball 32A. Due to an elastic force of spring 33A, ball 32A is urged against click ridge portion 31B. In the same manner as spring 33A, spring 33B is disposed on an outer peripheral side of ball 32B, and due to an elastic force of spring 33B, ball 32B is urged against click ridge portion 31B. With such a configuration, when rotary part 31 is rotated, balls 32A, 32B go over the continuously formed projections and depressions of click ridge portion 31B thus generating click feeling.

That is, ball 32A is stored between an inner peripheral wall of guide groove 31A of rotary part 31 and an inner peripheral wall of guide rail portion 34B of fixed part 34, and is in contact with rotary part 31. Spring 33A is stored between the inner peripheral wall of guide rail portion 34B and ball 32A, and includes the first end which is in contact with fixed part 34 and the second end which is in contact with ball 32A. Spring 33A urges ball 32A against click ridge portion 31B. Ball 32B and spring 33B are also in the same way.

As long as either one of a set of ball 32A and spring 33A or a set of ball 32B and spring 33B is provided, click feeling can be generated. Accordingly, it is not always necessary to use both of the sets. Other elastic bodies such as rubber and sponge may be used in place of springs 33A, 33B.

Panel 23 is formed using an insulating resin or the like, and hole 23J for disposing display device 24 is formed in a center portion of panel 23. Push panels 23A to 23I having upper surfaces to which a predetermined design is applied respectively are arranged on the periphery of hole 23J.

Display device 24 is formed of display 61 such as a liquid crystal display or an organic EL (electroluminescence) display, and cover lens 62 disposed on an upper surface of display 61. Display device 24 includes first portion 61A located inside operating ring 21, second portion 61B located outside operating ring 21, and third portion 62B connecting first portion 61A and second portion 61B. Although first portion 61A, second portion 61B, and third portion 62B are formed into an integral body, these first to third portions 61A, 61B, 62B may be formed separately. That is, display device 24 includes first portion 61A, second portion 61B, and third portion 62B located between first portion 61A and second portion 61B.

Display device 24 further includes first portion 61C located inside operating ring 22, and third portion 62A connecting first portion 61C and second portion 61B. Second portion 61B is also located outside operating ring 22. Display device 24 is disposed so as to face back surfaces of operating rings 21, 22.

Third portions 62A, 62B are arcuate groove portions formed on cover lens 62. Operating ring 21 and operating ring 22 are disposed on the grooves of third portions 62A, 62B. With such a configuration, the position of display device 24 with respect to operating rings 21, 22 is further fixed, and at the same time, a sense of unity between display device 24 and operating rings 21, 22 is enhanced.

Display device 24 is inserted into hole 23J, and is disposed so as to connect operating rings 21, 22. Since display device 24 is disposed inside and outside operating ring 21 in a straddling or connecting manner, a display area inside operating ring 21 can be increased. That is, a display area of first portion 61A can be increased. In the same manner, since display device 24 is disposed inside and outside operating ring 22 in a straddling or connecting manner, a display area inside operating ring 22 can be increased. That is, a display area of first portion 61C can be increased. Further, first portion 61A disposed inside operating ring 21, first portion 61C disposed inside operating ring 22, second portion 61B disposed between operating ring 21 and operating ring 22 can be connected to each other by third portions 62A, 62B thus forming one display 61.

Reflection-type photo sensor 51 is disposed on printed circuit board 25 at a position corresponding to an area below hole 34C of fixed part 34. When rotary part 31 is rotated, a plurality of recesses 31C each of which is formed for every one cycle of projection and depression of click ridge portion 31B pass through an area above photo sensor 51. Further, when rotary part 31 is rotated, an output signal of photo sensor 51 is changed so that the rotation of rotary part 31 can be detected. Photo sensor 52 for detecting the rotation of rotary part 41 is also mounted on printed circuit board 25.

Push switches 53A to 53I, control circuit 54, and a plurality of light emitting elements (not illustrated) are mounted on printed circuit board 25 in addition to above-mentioned photo sensors 51, 52. Push switches 53A to 53I are disposed below push panels 23A to 23I, respectively. When push panels 23A to 23I are pushed, output signals of push switches 53A to 53I are changed. Here, a plurality of push switches 53A may be disposed below one push panel 23A.

Control circuit 54 is connected to photo sensors 51, 52, push switches 53A to 53I, and light emitting elements via wiring of printed circuit board 25. Control circuit 54 determines a rotational position of rotary part 31 based on a change in output signal of photo sensor 51, and determines a rotational position of rotary part 41 based on a change in output signal of photo sensor 52. In this manner, photo sensors 51, 52 respectively function as rotation detecting sensors for determining the rotation operation of operating rings 21, 22 in cooperation with control circuit 54.

Control circuit 54 changes a display of first portion 61A of display device 24 based on a detected rotational position. That is, control circuit 54 changes a display of first portion 61A based on an output of photo sensor 52 which is a rotation detecting sensor. For example, in a mode where a set temperature of an air conditioner is changed, the set temperature is changed based on the detected rotational position. As described above, the display of first portion 61A is changed in conjunction with a rotational operation applied to operating ring 21.

Control circuit 54 determines which one of push panels 23A to 23I is pushed based on a change in output signals of push switches 53A to 53I. Based on the determination result, control circuit 54 changes the display of display device 24, and the pushed panel out of push panels 23A to 23I is illuminated by the light emitting element.

Figure 5:
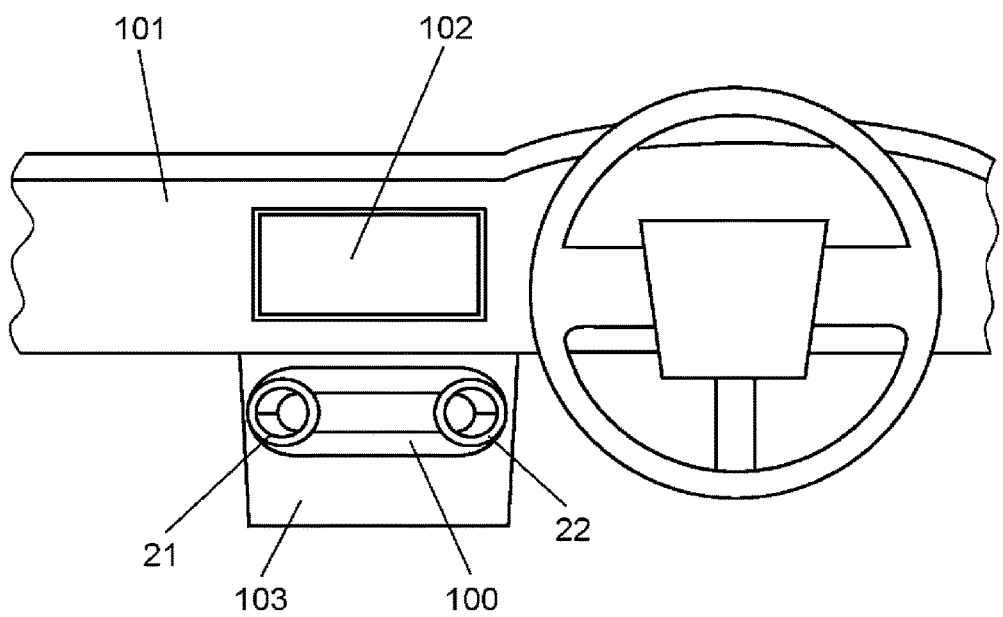
FIG. 5 is a view showing an arrangement of the operating panel device shown in FIG. 2.

Operating panel device 100 having the above-mentioned configuration is, as shown in FIG. 5, disposed between a driver's seat and a front passenger's seat in a vehicle, for example. FIG. 5 is a view showing an arrangement of operating panel device 100. FIG. 5 shows a case where operating panel device 100 is disposed on center console 103 located below vehicle-use display 102 used for a car navigation system and or like mounted on instrumental panel 101 as one example.

A driver operates operating panel device 100 using operating ring 22, and a passenger seated on a front passenger's seat operates operating panel device 100 using operating ring 21. Two operating rings 21, 22 are prepared for both passengers seated on the driver's seat and the front passenger's seat, respectively. Accordingly, operating panel device 100 can be operated at a position close to the user who operates operating panel device 100 and hence, can be conveniently used by the users.

In the above-mentioned description, the description is made with respect to operating panel device 100 which includes two operating rings 21, 22. However, it is sufficient to provide at least one operating ring, or three or more operating rings.

In the above-mentioned description, rotational positions of operating rings 21, 22 are detected by using photo sensors 51, 52. However, an electrostatic sensor or a magnetic field sensor may be used as the rotation detecting sensor. Provided that sensors can detect rotational positions of operating rings 21, 22, photo sensors 51, 52 may be suitably replaced.

Figure 6:
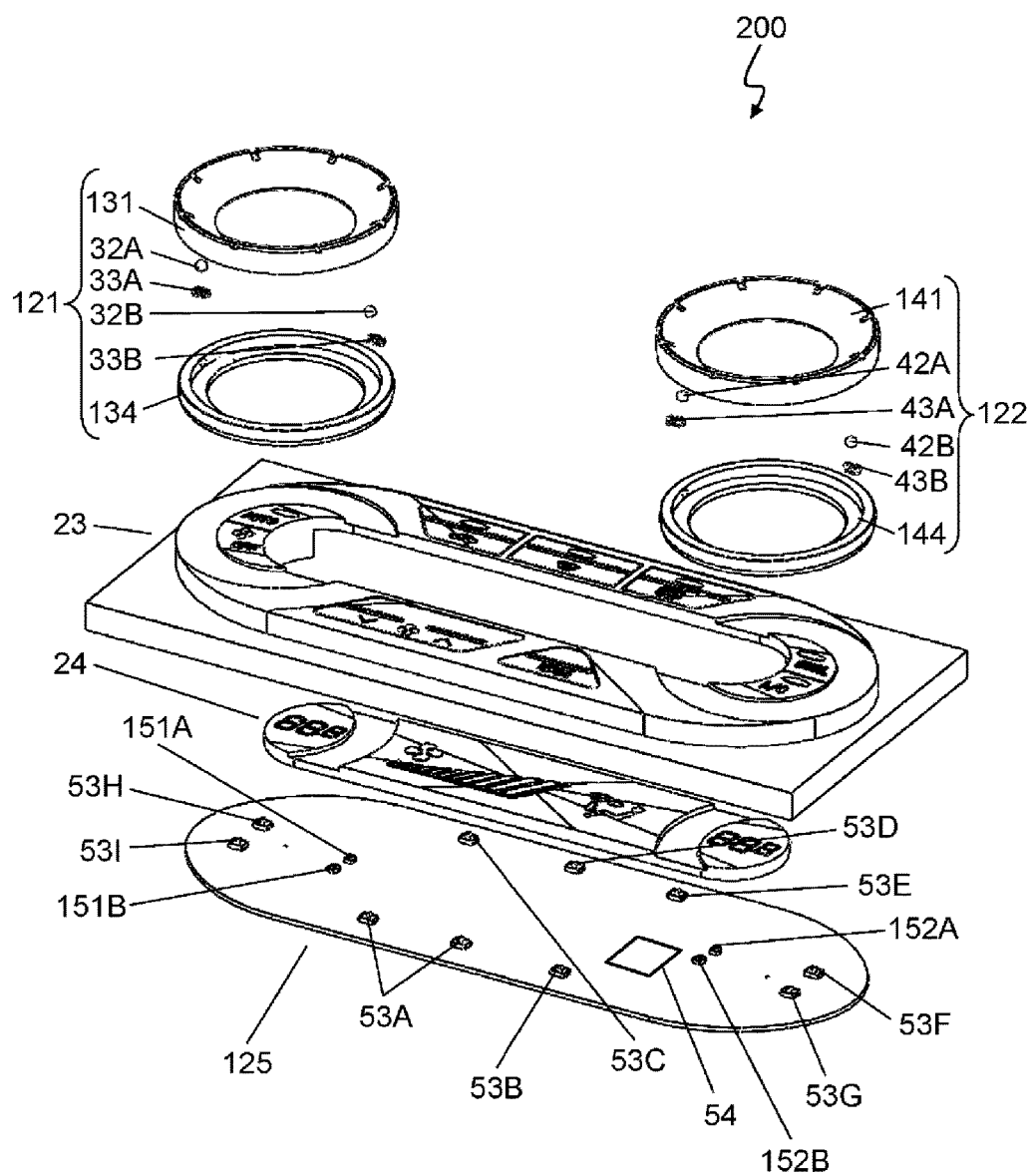
FIG. 6 is an exploded perspective view of another operating panel device according to the exemplary embodiment of the present invention.
Figure 7:
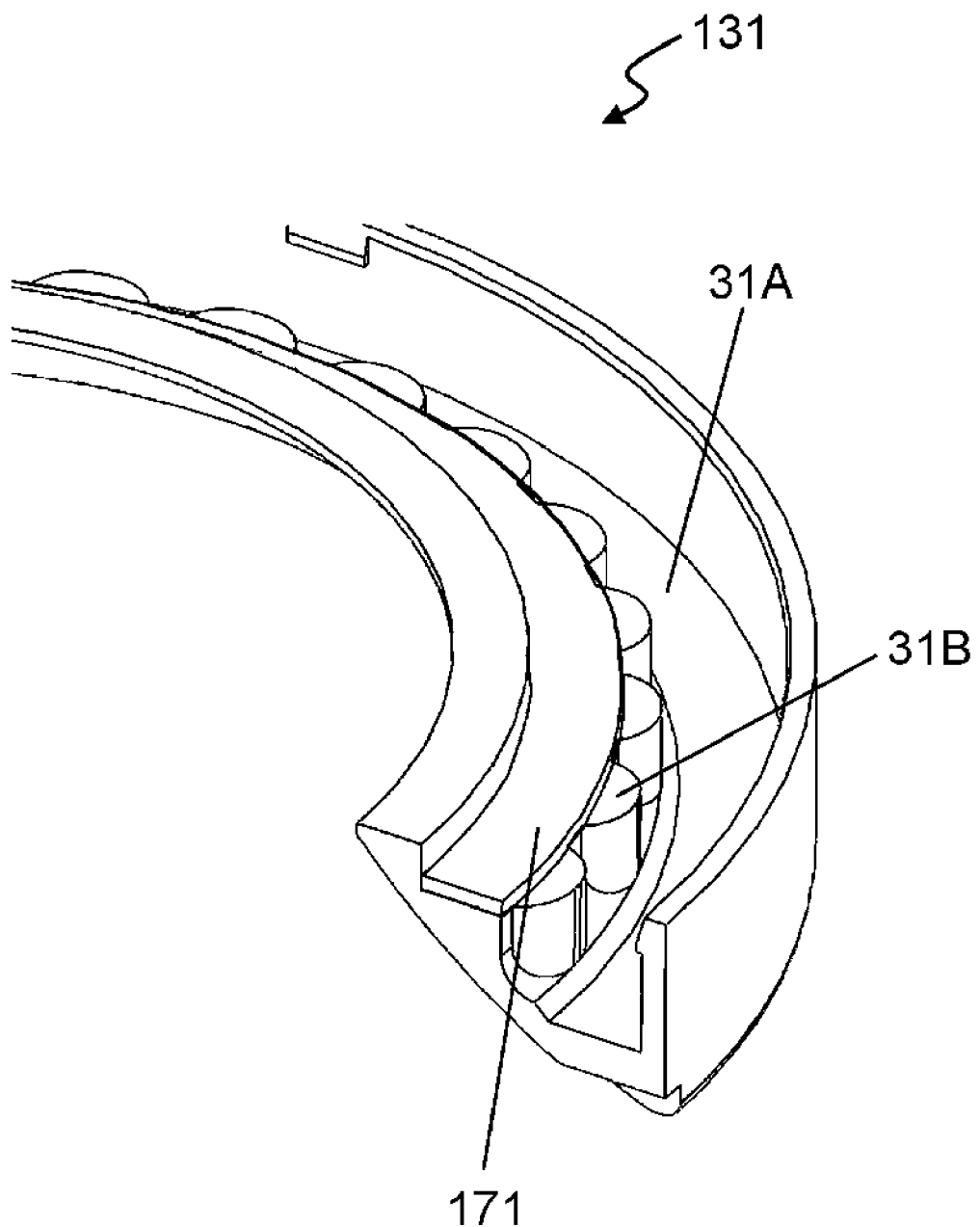
FIG. 7 is a perspective view with a part broken away of a rotary part of the operating panel device shown in FIG. 6.
Figure 8:
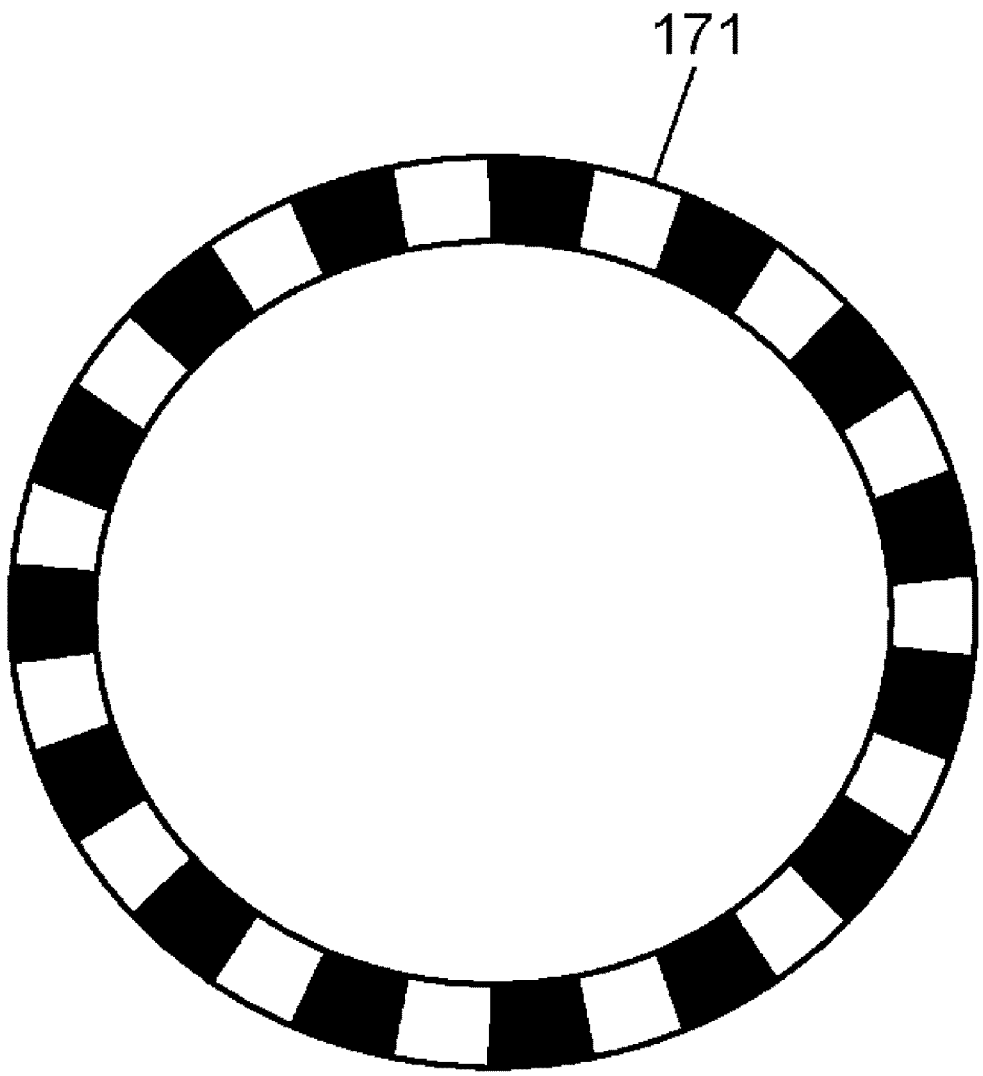
FIG. 8 is a view showing a magnetized state of a magnetization plate shown in FIG. 7.

One example of a configuration where magnetic field sensors are used is described. FIG. 6 is an exploded perspective view of operating panel device 200 including magnetic field sensors 151A, 151B, 152A, 152B. FIG. 7 is a perspective view with a part broken away of rotary part 131. FIG. 8 is a view showing a magnetized state of magnetization plate 171 fixed to rotary part 131.

In FIG. 6, magnetic field sensors 151A, 151B, 152A, 152B are disposed on printed circuit board 125. Operating ring 121 is disposed on magnetic field sensors 151A, 151B, and operating ring 122 is disposed on magnetic field sensors 152A, 152B. Further, display device 24 is disposed between magnetic field sensors 151A, 151B, 152A, 152B and operating rings 121, 122.

Operating ring 121 includes rotary part 131 and fixed part 134, and operating ring 122 includes rotary part 141 and fixed part 144. FIG. 7 is a perspective view of rotary part 131 as viewed from below, and rotary part 131 includes magnetization plate 171.

As shown in FIG. 7, in the same manner as rotary part 31, guide groove 31A is formed on rotary part 131, and click ridge portion 31B is formed on an inner peripheral wall of guide groove 31A over the whole circumference of the inner peripheral wall. Magnetization plate 171 is formed on upper surface of click ridge portion 31B in FIG. 7, and faces magnetic field sensors 151A, 151B disposed on printed circuit board 125 with fixed part 134, panel 23, and display device 24 interposed therebetween in the configuration shown in FIG. 6.

As shown in FIG. 8, an N pole and an S pole are alternately magnetized to magnetization plate 171. Although the N pole and the S pole do not actually have different colors, the N pole and the S pole are indicated by different colors in FIG. 8 to facilitate the understanding of the magnetization ranges.

When a user rotates rotary part 131, magnetization plate 171 is rotated, and magnetic fields detected by magnetic field sensors 151A, 151B are changed. Timing at which a magnetic field detected by magnetic field sensor 151A, 151B is switched between Hi and Lo differs between magnetic field sensor 151A and magnetic field sensor 151B. That is, there exists a phase difference between a magnetic field detected by magnetic field sensor 151A and a magnetic field detected by magnetic field sensor 151B. Due to such a phase difference, a rotation amount and a rotational direction of rotary part 131 are detected. As described above, magnetization plate 171, magnetic field sensors 151A, 151B, and control circuit 54 function as rotation detecting sensors, and the rotation detection sensor determines a rotational operation of operating ring 121 based on the difference between an input from magnetic field sensor 151A and an input from magnetic field sensor 151B.

With the use of magnetic field sensors 151A, 151B, compared to the case where photo sensors 51, 52 are used, the degree of freedom in positions where magnetic field sensors 151A, 151B are disposed on printed circuit board 125 is enhanced. When photo sensors 51, 52 are used, it is necessary to allow light to pass through display device 24 and hence, photo sensors 51, 52 cannot be disposed below display device 24. On the other hand, magnetic fields of magnetic field sensors 151A, 151B can pass through display device 24 and hence, magnetic field sensors 151A, 151B can be even disposed below display device 24. The number of the magnetic field sensors which face magnetization plate 171 may be three or more.

Operating ring 122 has substantially the same configuration as operating ring 121 and hence, the description of operating ring 122 is omitted.

With respect to FIG. 1 and FIG. 2, the description is made with respect to the configuration where push panels 23F to 23I are disposed inside operating rings 21, 22. Besides the above-mentioned configuration, a configuration may be adopted where a push panel is not disposed inside operating rings 21, 22, and the whole inner regions of operating rings 21, 22 and display device 24 overlap with each other. With such a configuration, numerals, symbols, and the like having a larger size can be displayed inside operating rings 21, 22.

As has been described heretofore, display device 24 disposed below operating rings 21, 22 is disposed inside and outside respective operating rings 21, 22 in a straddling or connecting manner. With such a configuration, first portions 61A, 61C of display device 24 can be increased in size inside operating rings 21, 22 and hence, visibility of first portions 61A, 61C can be enhanced so that a user can easily operate operating rings 21, 22.

With the arrangement of operating rings 21, 22, a passenger on a driver's seat and a passenger on a passenger's seat can easily operate operating rings 21, 22 respectively.

Operating ring 21 includes rotary part 31, balls 32A, 32B, springs 33A, 33B, and fixed part 34. Further, click ridge portion 31B is formed on rotary part 31, and springs 33A, 33B urge balls 32A, 32B against click ridge portion 31B. Accordingly, the operating panel device having a thin structure can give a predetermined click feeling to a user.

The operating panel device of the present invention has high visibility and can be easily operated by a user, and hence, the operating panel device is useful mainly as a vehicle-use system.

The invention claimed is:

1. An operating panel device comprising:
   an operating ring having an operable front surface and a back surface opposite to the front surface; and
   a display device including a first portion located inside the operating ring, a second portion located outside the operating ring, and a third portion connecting the first portion and the second portion, the display device being disposed to face the back surface of the operating ring, wherein:
   the third portion is an arcuate groove portion formed at a surface of the display device, the operating ring is disposed in the arcuate groove portion of the third portion, and
   a display of the first portion changes in conjunction with a rotational operation applied to the operating ring.

2. The operating panel device according to claim 1, wherein the operating ring is one of a plurality of operating rings, and the operating panel device includes the plurality of operating rings.

3. The operating panel device according to claim 1, wherein the operating ring includes:
   a rotary part having a ring shape and provided with a guide groove over a whole circumference on a surface facing the display device;
   a fixed part having a ring-shaped flat plate portion, and a guide rail portion projecting from the flat plate portion and located inside the guide groove over the whole circumference of the flat plate portion;
   a ball stored between an inner peripheral wall of the guide groove of the rotary part and an inner peripheral wall of the guide rail portion of the fixed part, the ball being in contact with the rotary part; and
   an elastic body stored between the inner peripheral wall of the guide rail portion of the fixed part and the ball, the elastic body including a first end in contact with the fixed part and a second end in contact with the ball,
   wherein click ridge portions having projections and depressions repeated over a whole circumference are formed on the inner peripheral wall of the guide groove of the rotary part, and the elastic body urges the ball against one of the click ridge portions.

4. The operating panel device according to claim 1, wherein:
   the surface of the display is a cover lens, and
   the arcuate groove portion is formed on the cover lens.

5. The operating panel device according to claim 1, further comprising a rotation detecting sensor for determining a rotational operation of the operating ring.

6. The operating panel device according to claim 5, wherein the rotation detecting sensor includes any one of a photo sensor, a magnetic field sensor, and an electrostatic sensor.

7. The operating panel device according to claim 5, wherein the rotation detecting sensor includes at least two magnetic field sensors, and a rotational operation of the operating ring is determined based on a difference between inputs of the magnetic field sensors.

8. The operating panel device according to claim 5, further comprising a control circuit for changing a display of the first portion based on an output from the rotation detecting sensor.

* * * * *